US009256338B2

(12) United States Patent
Yeh et al.

(10) Patent No.: US 9,256,338 B2
(45) Date of Patent: Feb. 9, 2016

(54) BACKLIGHT MODULE WITH LOW ELECTROMAGNETIC INTERFERENCE AND DISPLAY DEVICE USING THE SAME

(75) Inventors: Yen-Po Yeh, Hsin-Chu (TW); Jeng-Bin Hsu, Hsin-Chu (TW); Chih-Liang Pan, Hsin-Chu (TW); Yu-Hsiu Chang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 1584 days.

(21) Appl. No.: 12/853,496

(22) Filed: Aug. 10, 2010

(65) Prior Publication Data

US 2011/0037717 A1  Feb. 17, 2011

(30) Foreign Application Priority Data

Aug. 11, 2009 (TW) ............................... 98127003 A

(51) Int. Cl.
  *G06F 3/046* (2006.01)
  *G02F 1/1333* (2006.01)
  *G02F 1/1335* (2006.01)

(52) U.S. Cl.
  CPC .......... *G06F 3/046* (2013.01); *G02F 1/133608* (2013.01); *G02F 1/133308* (2013.01); *G02F 1/133615* (2013.01)

(58) Field of Classification Search
  CPC ................ G02F 1/133615; G02F 1/133308
  USPC ............ 174/254, 117 R, 117 F, 117 FF, 268, 174/72 TR; 345/173, 102, 87
  See application file for complete search history.

(56) References Cited

U.S. PATENT DOCUMENTS

| 5,250,758 | A  | * | 10/1993 | Fjelstad et al. ................ 174/254 |
| 2003/0016312 | A1 | * | 1/2003 | Park et al. ........................ 349/58 |
| 2007/0153548 | A1 | * | 7/2007 | Hamada et al. ............... 362/615 |

(Continued)

FOREIGN PATENT DOCUMENTS

| CN | 1869776 A | 11/2006 |
| JP | 2000-267072 A | 9/2000 |

(Continued)

OTHER PUBLICATIONS

English translation of abstract JP2002-229022.

(Continued)

*Primary Examiner* — Kathy Wang-Hurst
*Assistant Examiner* — Jose Soto Lopez
(74) *Attorney, Agent, or Firm* — McClure, Qualey & Rodack, LLP

(57) ABSTRACT

A display device includes a display panel, an electromagnetic touch panel, and a backlight module overlapping one another. The backlight module has a light guide plate and a light source module consisting of a flexible circuit board strip. The flexible circuit board strip includes a light source section and a signal transmission section extending along a light entrance edge and a side edge adjacent to the light entrance edge of the light guide plate, respectively. Two ends of a connection section are connected to the light source section and the signal transmission section, respectively. The connection section includes at least one first fold making the light source disposing plane of the light source section and the wiring disposing plane of the signal transmission section be non-coplanar and also makes the wiring disposing plane be parallel to the plane of the side edge of the light guide plate.

13 Claims, 9 Drawing Sheets

(56) References Cited

U.S. PATENT DOCUMENTS

| | | | |
|---|---|---|---|
| 2010/0060601 A1* | 3/2010 | Oohira | 345/173 |
| 2010/0118225 A1* | 5/2010 | Lee | 349/58 |

FOREIGN PATENT DOCUMENTS

| | | |
|---|---|---|
| JP | 2002-229022 A | 8/2002 |
| JP | 2005-267881 A | 9/2005 |
| JP | 2005-294172 A | 10/2005 |
| JP | 2007-242450 A | 9/2007 |

OTHER PUBLICATIONS

English translation of abstract of JP2005-267881.
English translation of abstract of CN1869776.
English translation of abstract of JP2005-294172.
English translation of abstract of JP2007-242450.
English translation of abstract of JP2000-267072.

* cited by examiner

BACKLIGHT MODULE WITH LOW ELECTROMAGNETIC INTERFERENCE AND DISPLAY DEVICE USING THE SAME

BACKGROUND OF THE INVENTION

1. Field of the Invention

This invention generally relates to a backlight module and a display device using the same. More particularly, this invention relates to a backlight module capable of reducing interference to an electromagnetic touch panel and a display device using the same.

2. Description of the Prior Art

As the competitiveness of electronic products becomes more and more drastic, the design of various electronic products is much more diverse. Apart from the improvement in functions, product appearance and user interface are also important concerns of design. In the design of electronic products, the use of touch display device has become an important part. The touch display device on one hand can provide the display function and on the other hand, can serve as the interface for communication with users.

Conventional touch display devices mostly adopt the combination of a touch panel and a display panel. The touch panels are typically classified into resistance type, capacitive type, and electromagnetic type based on their operational principles. Specifically, the electromagnetic touch panel has better durability, high sensitivity, and Z-axis sensing ability; therefore, the electromagnetic touch panel is popular in the touch panel market.

FIG. 1 is a schematic view of a conventional electromagnetic touch display device. The electromagnetic touch display device includes a liquid crystal display panel 10, an electromagnetic touch panel 20, and a backlight module 30. The electromagnetic touch panel 20 is disposed on the back side of the liquid crystal display panel 10 and the backlight module 30, i.e. not on the image display side. The backlight module 30 is disposed on the back side of the liquid crystal display panel 10 to provide the liquid crystal display panel 10 with required light for displaying images. The backlight module 30 includes a light source structure consisting of a flexible circuit board 31 and light emitting diodes 33. Since the light source structure is connected to a signal source 50 disposed outside the backlight module 30 by means of the flexible circuit board 31, the flexible circuit board 31 has to go across the area between the electromagnetic touch panel 20 and the display panel 10. However, in the conventional design, the flexible circuit board 31 is disposed with metal wires which interfere with the touch sensing operation of the electromagnetic touch panel 20 and accordingly impair the sensing accuracy.

SUMMARY OF THE INVENTION

An object of this invention is to provide a backlight module to reduce the interference to the sensing operation of an electromagnetic touch panel used therewith.

Another object of this invention is to provide a backlight module with a flexible wiring designed light source module.

Another further object of this invention is to provide a display device with enhanced touch sensing performance.

The display device of this invention includes a display panel, an electromagnetic touch panel, and a backlight module. The electromagnetic touch panel is arranged on the back side of the display panel, and the backlight module is disposed between the display panel and the electromagnetic touch panel. The backlight module generates light and provides the light to the display panel, such that images can be displayed on the display panel. The backlight module includes a light guide plate and a light source module. The light guide plate is disposed between the display panel and the electromagnetic touch panel and has a light entrance edge corresponding to a first side of the electromagnetic touch panel. The light guide plate further includes one side edge which is parallel to and corresponds to a second side of the electromagnetic touch panel.

The light source module consists of a flexible circuit board strip and at least one light source. The flexible circuit board strip includes a light source section, a connection section, and a signal transmission section, wherein the light source section extends along the light entrance edge of the light guide plate and the first side of the electromagnetic touch panel. Moreover, the light source section has a light source disposing plane for the light source to be disposed thereon. The signal transmission section extends along the side edge of the light guide plate and the second side of the electromagnetic touch panel, and the extending direction thereof is substantially perpendicular to the extending direction of the light source section. The signal transmission section has a wiring disposing plane to include a second angle $\theta_2$ with respect to the light source disposing plane. If the electromagnetic touch panel is considered as a horizontal plane, the wiring disposing plane is disposed on the vertical plane with respect to the electromagnetic touch panel. A first fold and a second fold are formed on the connection section, such that the light source section and the signal transmission section are parallel to and perpendicular to the light guide plate, respectively.

With the arrangement described above, the area of the signal transmission section projected on the electromagnetic touch panel can be minimized to about the thickness of the signal transmission section, which is measured along a normal to the wiring disposing plane. Therefore, the influence of signal wiring of the signal transmission section or transmitted power and signals to the sensing operation of the electromagnetic touch panel can be minimized. Furthermore, since the signal transmission section is disposed vertically, the increase in width or area of the overall module is significantly limited when the signal transmission section is disposed on the side edge of the light guide plate or the second side of the electromagnetic touch panel.

DETAILED DESCRIPTION OF THE PREFERRED EMBODIMENT

This invention provides a backlight module and a display device using the same. In one embodiment, the display device can be a liquid crystal display device, including household liquid crystal televisions, liquid crystal monitors for personal computers and laptop computers, liquid crystal displays of mobile phones and digital cameras, and other liquid crystal display devices of electronic products. However, in other embodiments, the display device can be an electronic paper display device or products with other type of display panel.

Figure 1:
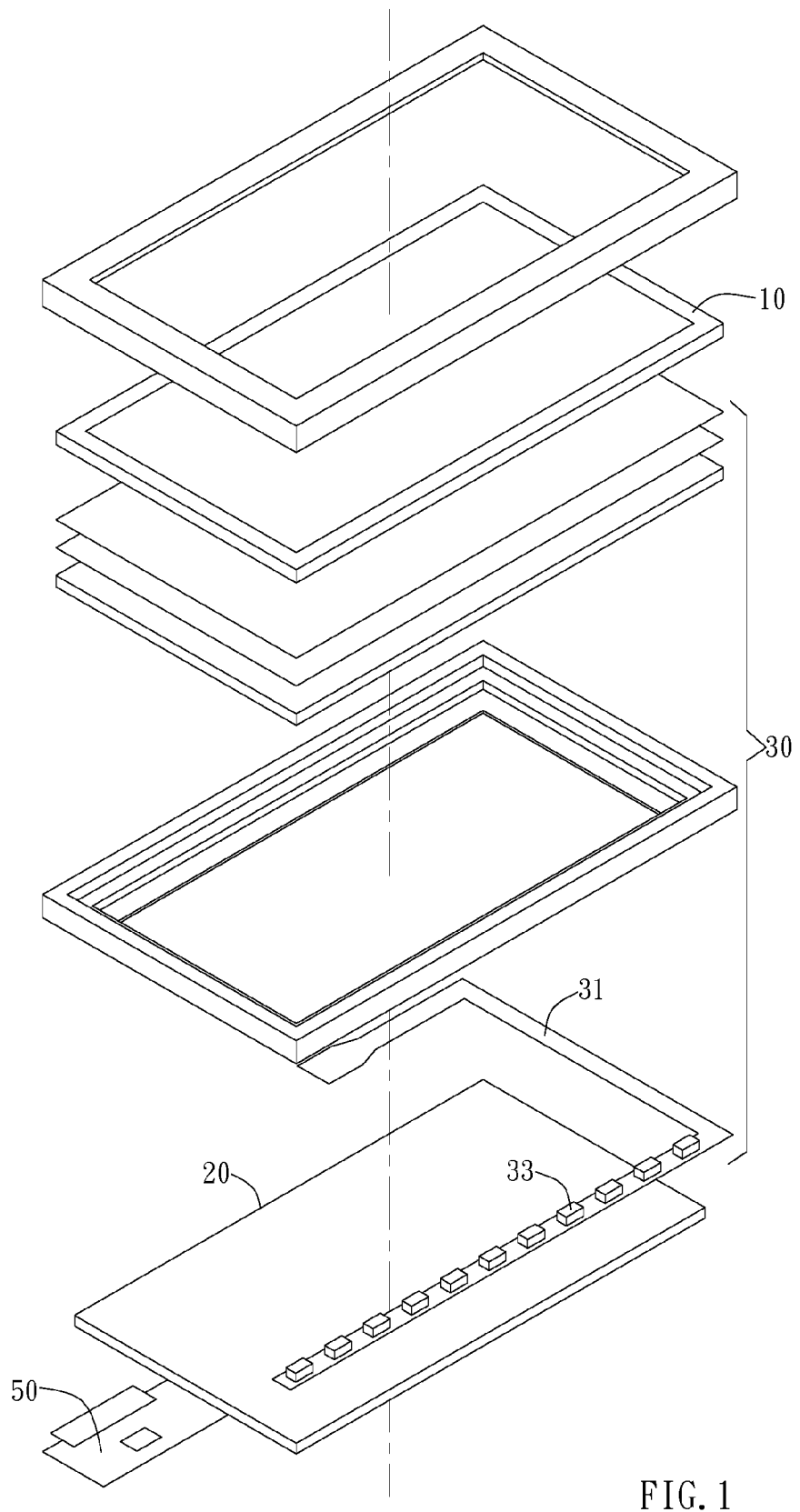
FIG. 1 is a schematic view of a conventional electromagnetic touch display device.
Figure 2:
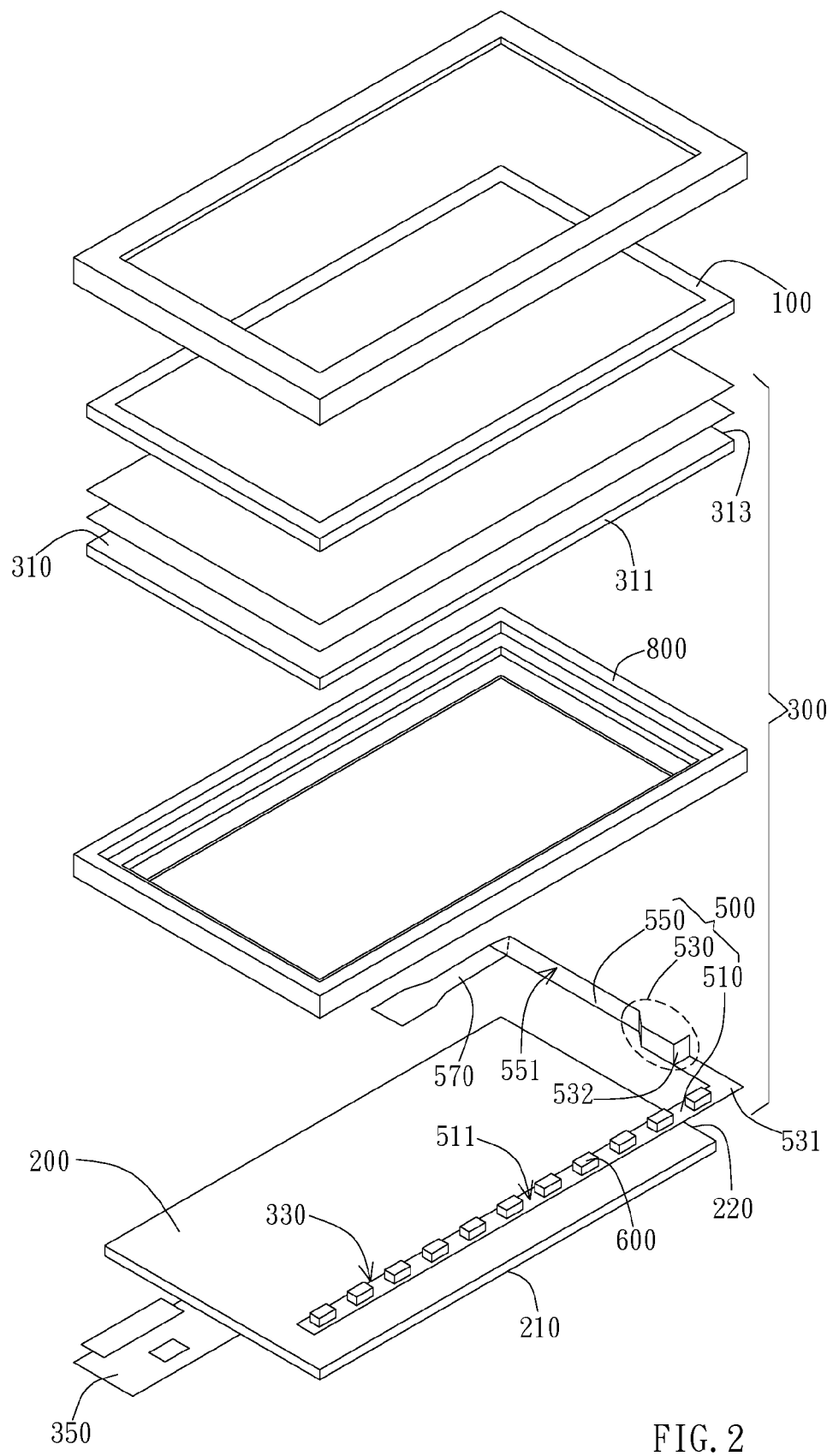
FIG. 2 is a schematic view of a display device in accordance with one embodiment of this invention.

As shown in FIG. 2, the display device includes a display panel 100, an electromagnetic touch panel 200, and a backlight module 300. In this embodiment, the display panel 100 is preferably a liquid crystal display panel; however, in other embodiments, the display panel 100 can be an electrophoretic display panel or other types of display panels. The electromagnetic touch panel 200 is preferably disposed on the back side of the display panel 100, i.e. not on the image display side. As shown in FIG. 2, the electromagnetic touch panel 200 is stacked parallel to the display panel 100, and the backlight module 300 is disposed between the display panel 100 and the electromagnetic touch panel 200. The backlight module 300 is configured to generate and provide required light to the display panel 100, such that the display panel 100 can display images.

In this embodiment, the backlight module 300 preferably includes a light guide plate 310 and a light source module 330. As shown in FIG. 2, the light guide plate 310 is disposed between the display panel 100 and the electromagnetic touch panel 200. The light guide plate 310 has a light entrance edge 311, which is parallel to and corresponds to the first side 210 of the electromagnetic touch panel 200. The light guide plate 310 further has a side edge 313, which is parallel to and corresponds to the second side 220 of the electromagnetic touch panel 200. As shown in FIG. 2, the light entrance edge 311 and the first side 210 are respectively adjacent to the side edge 313 and the second side 220 to include an angle.

Figure 3:
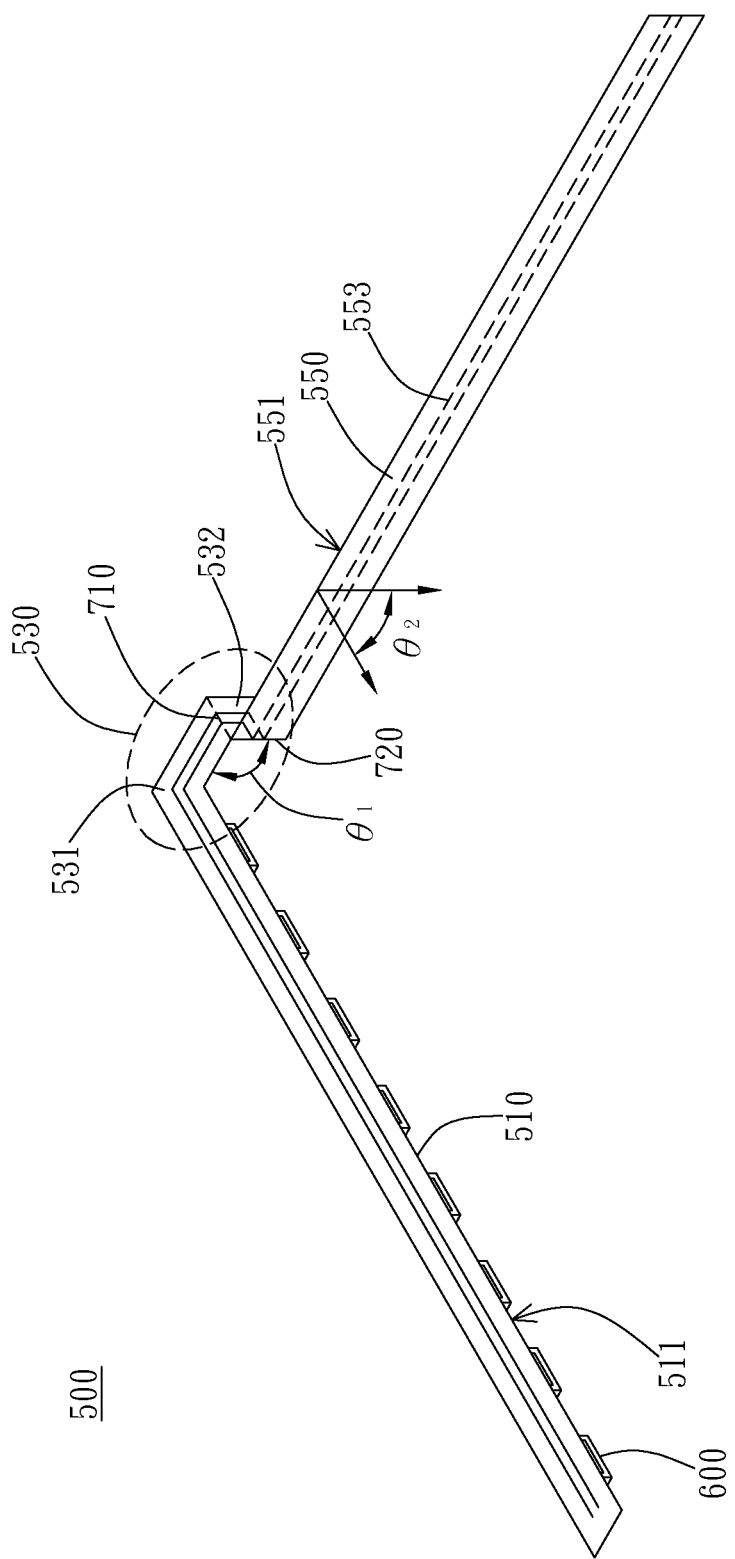
FIG. 3 is a schematic view of an embodiment of a light source module.

As shown in FIG. 2 and FIG. 3, the light source module 330 consists of a flexible circuit board strip 500 and at least one light source 600. The flexible circuit board strip 500 is preferably made by cutting from a flexible printed circuit board (FPC), and the light source 600 preferably includes a side view light emitting diode (LED), which emits light from the lateral side. The flexible circuit board strip 500 includes a light source section 510, a connection section 530, and a signal transmission section 550. The light source section 510 preferably extends along the light entrance edge 311 of the light guide plate 310 and the first side 210 of the electromagnetic touch panel 200. Moreover, the light source section 510 has a light source disposing plane 511. As shown in FIG. 2, the light source disposing plane 511 is preferably parallel to the light guide plate 310 and the electromagnetic touch panel 200. That is, the light source disposing plane 511 is perpendicular to the plane of the light entrance edge 311 of the light guide plate 310 and the plane of the first side 210 of the electromagnetic touch panel 200. The light source 600 is disposed on the light source disposing plane 511 and preferably emits light parallel to the light source disposing plane 511 towards the light entrance edge 311 of the light guide plate 310. In one embodiment, the light source disposing plane 511 is referred to the surface of the wider extent of the strip type light source section 510.

As shown in FIG. 2 and FIG. 3, the signal transmission section 550 extends along the side edge 313 of the light guide plate 310 and the second side 220 of the electromagnetic touch panel 200, and the extending direction thereof is preferably perpendicular to the extending direction of the light source section 510. The signal transmission section 550 has a wiring disposing plane 551 with signal wiring 553 disposed thereon. The signal wiring 553 is connected to the light source 600 to provide power to the light source 600 for emitting light. In one embodiment, the wiring disposing plane 551 is referred to the surface of the wider extent of the strip type signal transmission section 550. Moreover, the wiring disposing plane 551 can be on either side of the signal transmission section 550. In other words, the wiring disposing plane 551 and the light source disposing plane 511 can be located on the same side or opposite sides of the flexible circuit board strip 500. The wiring disposing plane 551 includes a second angle $\theta_2$ with respect to the light source disposing plane 511. In one embodiment, the second angle $\theta_2$ is a right angle, i.e. 90 degrees. However, in other embodiments, the second angle can be modified according to different design need. Moreover, the wiring disposing plane 551 is preferably parallel to the plane of the side edge 313 of the light guide plate 310. If the electromagnetic touch panel 200 is considered as a horizontal plane, the wiring disposing plane 551 is disposed on a vertical plane with respect to the electromagnetic touch panel 200.

Figure 4:
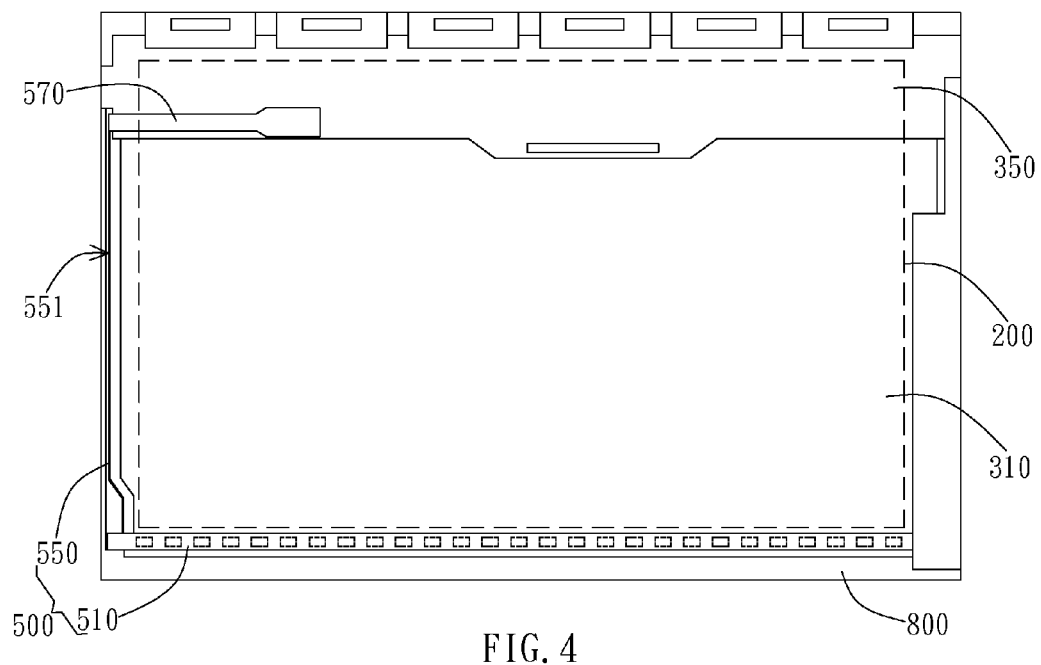
FIG. 4 is a schematic rear view of an embodiment of a display device.

As shown in FIG. 4, in the arrangement described above, the area of the signal transmission section 550 projected on the electromagnetic touch panel 200 can be minimized to about only the thickness of the signal transmission section 550, which is measured along the normal to the wiring disposing plane 551. Therefore, the influence of the signal wiring 553 or the transmitted power and signals to the electromagnetic touch panel 200 during sensing can be minimized. Moreover, since the signal transmission section 550 is disposed vertically, the increase in width and area of the overall module is significantly limited when the signal transmission section 550 is disposed the side edge 312 of the light guide plate 310 or the second side 220 of the electromagnetic touch panel 200.

As shown in FIG. 2 and FIG. 3, the connection section 530 has a first end 531 and a second end 532. The first end 531 is connected to one end of the light source section 510, and the second end 532 is connected to one end of the signal transmission section 550. In other words, the connection section 530 is connected between the light source section 510 and the signal transmission section 550. The connection section 530 has a first fold 710 and a second fold 720. In this embodiment, the first fold 710 is close to the first end 531 of the connection section 530, and the second fold 720 is close to the second end 532. As shown in FIG. 3, when the folding process is completed, a portion of the connection section 530, which is between the first fold 710 and the second fold 720, and the light source disposing plane 511 are non-coplanar and include a first angle $\theta_1$. In one embodiment, the first angle $\theta_1$ is about 90 degrees. However, in other embodiment, the first angle $\theta_1$ can be modified based on the relative positions of elements. Moreover, the second fold 720 is preferably located on the second end 532 of the connection section 530, i.e. on the intersection of the connection section 530 and the signal transmission section 550. When the folding process is completed, the second fold 720 makes the wiring disposing plane 551 and the light source disposing plane 511 include the second angle 82 described above and also makes the extending direction of the signal transmission section 550 be parallel to the light source disposing plane 511 or perpendicular to the normal to the light source disposing plane 511. In other words, in this embodiment, when the first fold 710 and the second fold 720 are formed, the light source disposing plane 511, the wiring disposing plane 551, and the portion of the connection section 530 between the first fold 710 and the second fold 720 are non-coplanar with respect to each other and preferably perpendicular to each other.

Figure 5:
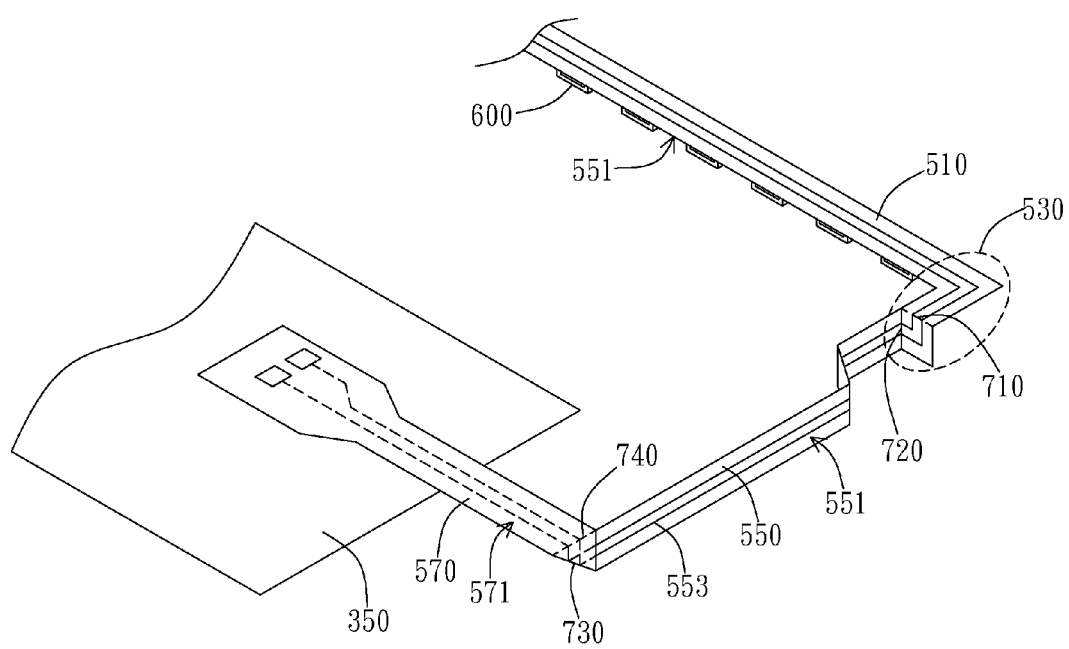
FIG. 5 is a schematic view of an embodiment of a signal connection section.

As shown in FIG. 5, the flexible circuit board strip 500 further includes a signal connection section 570 connected to the other end of the signal transmission section 550 opposite to the connection section 530. The extending direction of the signal connection section 570 includes an angle with respect to the extending direction of the signal transmission section 550, and this angle is preferably about 90 degrees. Moreover, the signal connection section 570 further includes a signal connection plane 571 parallel to the light guide plate 310 and the electromagnetic touch panel 200. In one embodiment, the signal connection plane 571 is referred to the surface of wider extent of the strip type signal connection section 570. A control circuit board 350 is preferably provided on the back side of the backlight module 300 and parallel to the light guide plate 310, as shown in FIG. 2 and FIG. 5. The signal connection plane 571 is horizontally connected to the control circuit board 350 to receive power and signals from the control circuit board 350 and transmit them to the light source 600 through signal transmission section 550, so that the light source 600 can emit light. In this embodiment, the signal transmission section 550 and the signal connection section 570 can be considered as two different sections of the same flexible circuit board strip. However, in other embodiments, the signal connection section 570 can be constituted by arranging other electronic elements.

In the embodiment of FIG. 5, the connection region of the signal connection section 570 and the signal transmission section 550 includes a third fold 730 and a fourth fold 740. The third fold 730 is close to the signal transmission section 550, and the fourth fold 740 is close to the signal connection section 570. As shown in FIG. 5, the signal connection section 570 is folded inwardly towards the light guide plate 310 to form the third fold 730, and the fold line of the third fold 730 preferably includes an angle of about 45 degrees with respect to the extending direction of the signal transmission section 550. However, in other embodiments, the signal connection section 570 can be folded outwardly opposite to the light guide plate 310 to form the third fold 730. After forming the third fold 730, the folded part is then folded at an angle preferably of 90 degrees towards the light guide plate 310 or the control circuit board 350 to form the fourth fold 740. The fold line of the fourth fold 740 is preferably perpendicular to the extending direction of the signal connection section 570. As shown in FIG. 5, a portion of the flexible circuit board strip between the third fold 730 and the fourth fold 740 overlaps the wiring disposing plane 551 and is substantially perpendicular to the signal connection plane 571.

Figure 6A:
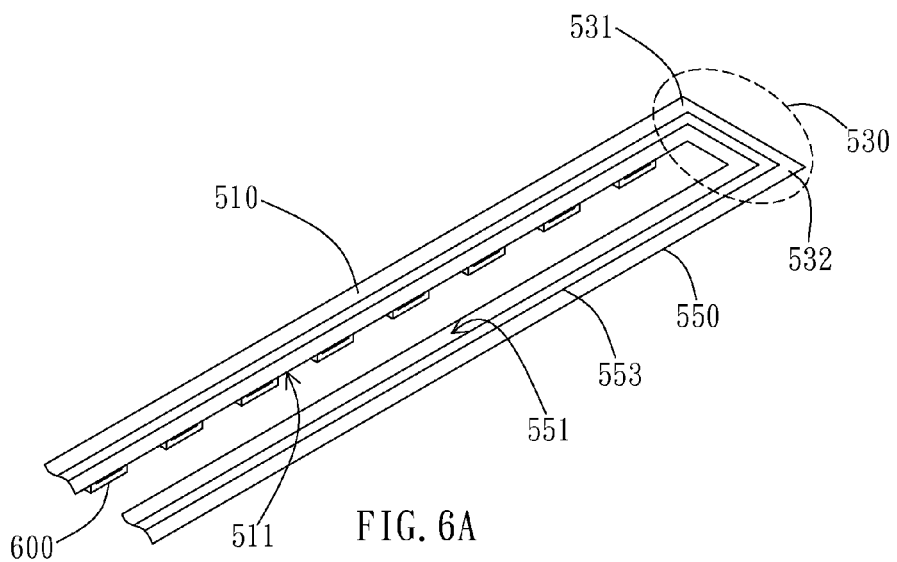
FIG. 6A is a schematic view of an embodiment before bending the light source module.

In the embodiment of FIG. 6A, before the first fold 710 and the second fold 720 are formed, the light source section 510 and the signal transmission section 550 are disposed side by side, and the light source disposing plane 511 and the wiring disposing plane 551 are coplanar. The connection section 530 is transversely connected between the light source section 510 and the signal transmission section 550, such that the flexible circuit board strip 500 is in a form of U-shaped structure. In one embodiment, the flexible circuit board strip 500 can be made by directly cutting from a whole piece of flexible printed circuit board to form the light source section 510, the connection section 530, and the signal transmission section 550 in one piece.

Figure 6B:
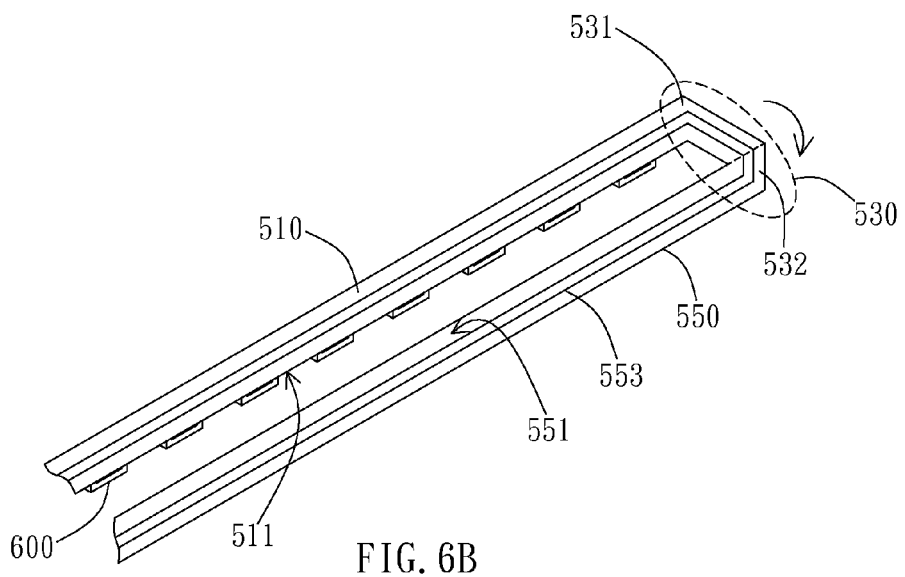
FIG. 6B is a schematic view of the embodiment of FIG. 6A after a first fold is formed.
Figure 6C:
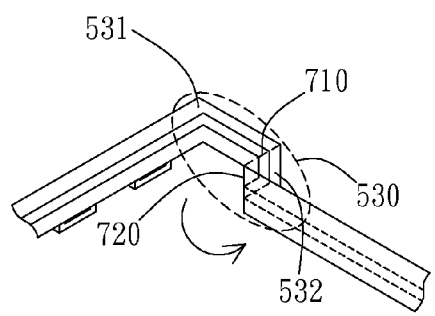
FIG. 6C is a schematic view of the embodiment of FIG. 6B after a second fold is formed.

As shown in FIG. 6B, the connection section 530 is first bent downwards from the middle at an angle preferably of about 90 degrees to form the first fold 710. In other embodiments, the first fold 710 can be formed on the first end 531 of the connection section 530 or other suitable places. As shown in FIG. 6B, the fold line of the first fold 710 is preferably parallel to the extending direction of the light source section 510, such that the folded part of the connection section 530 is substantially parallel to the light entrance edge 311 of the light guide plate 310. As shown in FIG. 6C, the connection section 530 is folded from the second end 532 at an angle preferably of 90 degrees towards the side edge 313 of the light guide plate 310 to form the second fold 720. The fold line of the second fold 720 is preferably parallel to the normal to the light source disposing plane 511. In the embodiment shown in FIG. 6C, when the first fold 710 and the second fold 720 are formed, the fold line of the first fold 710 is perpendicular to the fold line of the second fold 720. Moreover, part of the connection section 530 between the first fold 710 and the second fold 720 is perpendicular to the light source disposing plane 511 and the wiring disposing plane 551.

Figure 7:
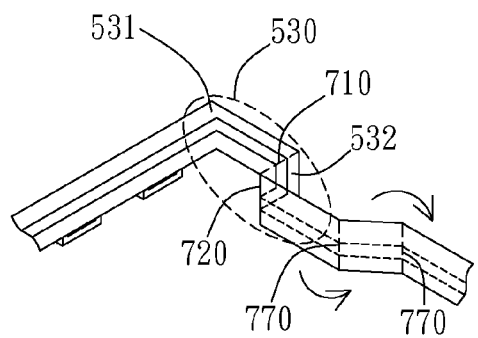
FIG. 7 is a schematic view of an embodiment showing an auxiliary fold.

In the embodiment shown in FIG. 7, one or more auxiliary folds 770 can be formed on the signal transmission section 550, and the folding line thereof is preferably perpendicular to the extending direction of the signal transmission section 550. With the disposition of the auxiliary fold 770, the position and the distance of the signal transmission section 550 with respect to the side edges of the light guide plate 310 and the electromagnetic touch panel 200 can be modified. As shown in FIG. 7, two auxiliary folds 770 with opposite folding directions are disposed on the signal transmission section 550, such that part of the signal transmission section 550 between the two auxiliary folds 770 is laterally shifted, thereby the part of the signal transmission section 550 between the two auxiliary folds 770 is further away from the side edges of the light guide plate 310 and the electromagnetic touch panel 200. However, in other embodiments, it is possible to employ different number of the auxiliary folds 770 and vary the positions of the auxiliary folds 770 to change the location of the signal transmission section 550 for the purpose of achieving spatial integration with other elements. As such, the interference to the sensing operation of the electromagnetic touch panel 200 can be further reduced.

Figure 8:
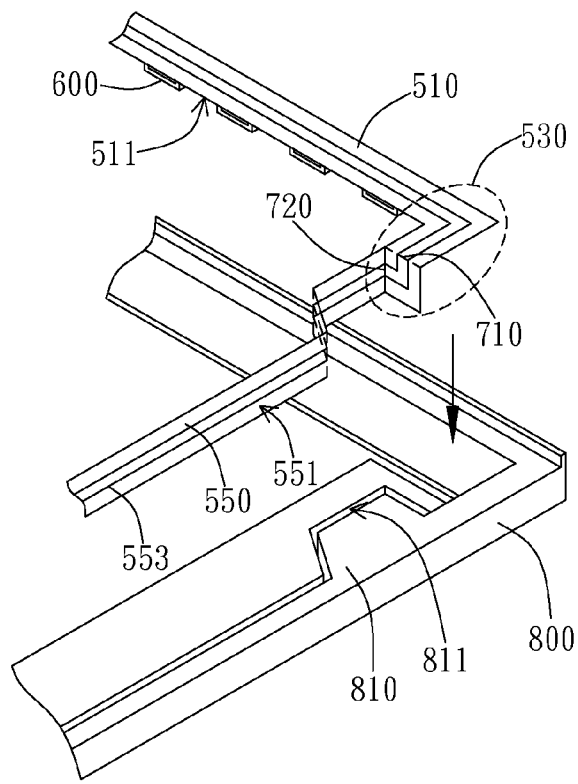
FIG. 8 is a schematic view of an embodiment of a frame.

As shown in FIG. 8, the backlight module 300 further includes a frame 800 surrounding the light guide plate 310 and the electromagnetic touch panel 200. In one embodiment, the frame 800 can be made of plastics. The frame 800 has sidewall 810 corresponding to the side edge 313 of the light guide plate 310 and the second side 220 of the electromagnetic touch panel 200. As shown in FIG. 8, a groove 811 is formed in the sidewall 810 by cutting into the sidewall 810 from the plane parallel to the light guide plate 310. In this embodiment, the plane is preferably a bottom surface opposite to the image displaying direction of the display panel 100. The signal transmission section 550 is preferably inserted from the plane of the sidewall 810 and received in the groove 811. In this embodiment, since two auxiliary folds 770 of opposite directions are formed on the signal transmission section 550, the groove 811 accordingly has a corresponding bending shape. With this bending configuration, the distance between the groove 811 and the surface of the sidewall 810 facing the light guide plate 310 can be increased to enhance the structural strength.

Figure 9A:
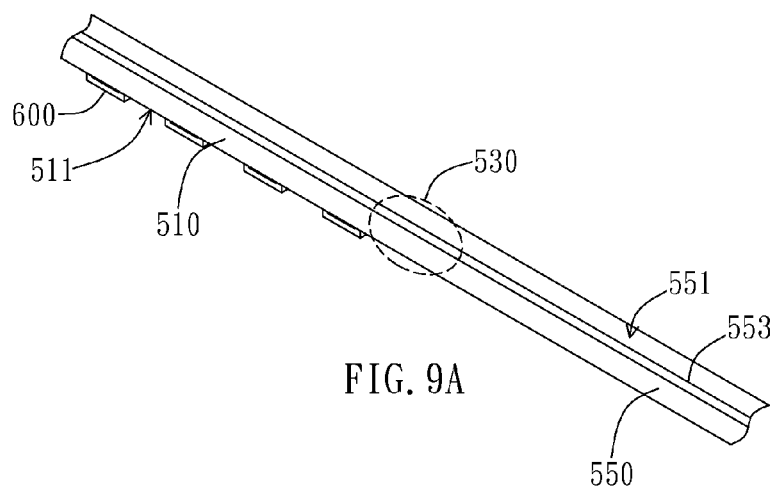
FIG. 9A is a schematic view of another embodiment before bending the light source module.

FIG. 9A shows another embodiment of this invention. In this embodiment, before forming the first fold 710 and the second fold 720, the light source section 510, the connection section 530, and the signal transmission section 550 are disposed collinearly, i.e. arranged in a straight line. Furthermore, the light source disposing plane 511 and the wiring disposing plane 551 are coplanar. In one embodiment, the flexible circuit board strip 500 can be formed by directly cutting from a whole piece of flexible printed circuit board based on the desired shape to form the light source section 510, the connection section 530, and the signal transmission section 550 in one piece.

Figure 9B:
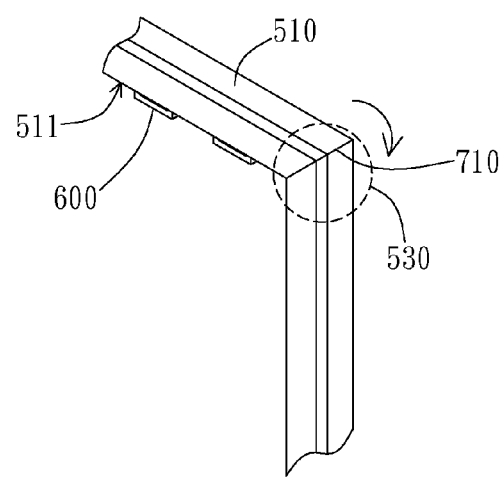
FIG. 9B is a schematic view of the embodiment of FIG. 9A after a first fold is formed.
Figure 9C:
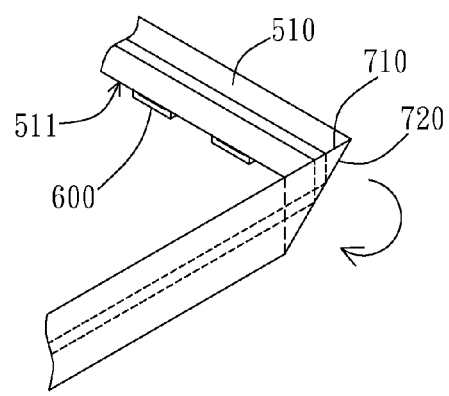
FIG. 9C is a schematic view of the embodiment of FIG. 9B after a second fold is formed.

As shown in FIG. 9B, the connection section 530 is first bent downwards at an angle preferably of 90 degrees to form the first fold 710. The fold line of the first fold 710 is preferably perpendicular to the extending direction of the light source section 510. Therefore, the folded connection section 530 is substantially parallel to the plane of the side edge 313 of the light guide plate 310. After that, as shown in FIG. 9C, the connection section 530 is again bent outwardly opposite to the light guide plate 310 to form the second fold 720. The fold line of the second fold 720 is inclined a certain angle from the extending direction of the signal transmission section 550 along the wiring disposing plane 551. This angle is preferably about 45 degrees but can be modified according to the position adjustment requirement. From another perception, the fold line of the second fold 720 is inclined an angle from the direction of the normal to the light source disposing plane 511 along the wiring disposing plane 551. In other embodiments, the connection section 530 can be folded inwardly towards the light guide plate 310 to form the second fold 720. In the embodiment of FIG. 9C, when the first fold 710 and the second fold 720 are formed, the fold line of the first fold 710 and the fold line of the second fold 720 preferably include an angle of about 45 degrees. Furthermore, part of the connection section 530 between the first fold 710 and the second fold 720 is parallel to the wiring disposing plane 551 and partially overlaps the wiring disposing plane 551.

Figure 10:
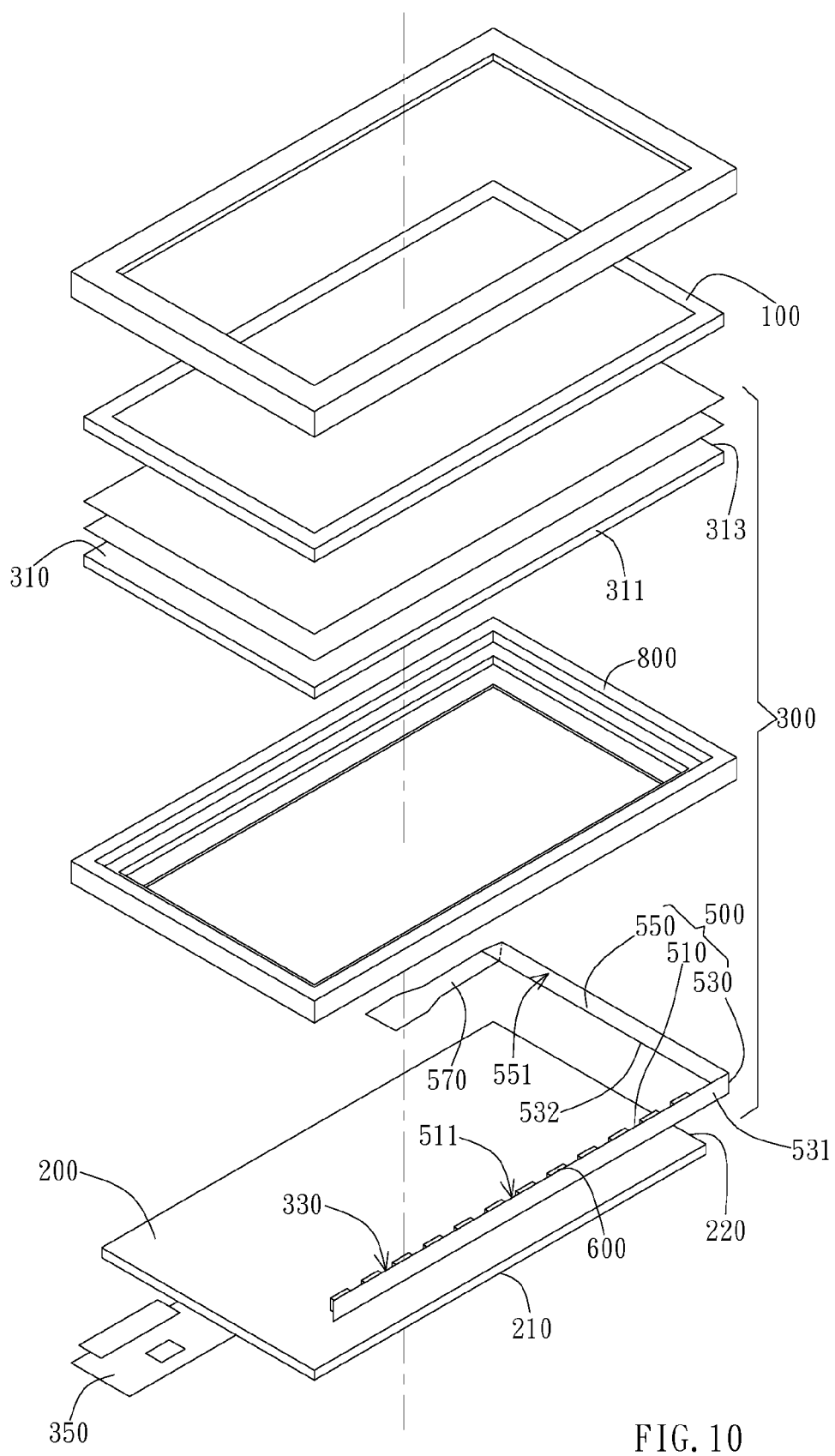
FIG. 10 is a schematic view of a display device in accordance with another embodiment of this invention.

FIG. 10 shows another embodiment of the display device. In this embodiment, with regard to functions and relative positions of the display panel 100, the electromagnetic touch panel 200, and the backlight module 300 are similar to those of FIG. 2 and will not be elaborated hereinafter. In this embodiment, the backlight module 300 includes a light guide plate 310 and a light source module 330. The light guide plate 310 includes a light entrance edge 311 and a side edge 313 adjacent to each other. Similarly, in this embodiment, the light entrance edge 311 and the side edge 313 correspond to the first side 210 and the second side 220 of the electromagnetic touch panel 200, and the light source module 330 consists of a flexible circuit board strip 500 and at least one light source 600. However, in this embodiment, the light source 600 preferably includes a top view LED, which emits light form the top surface. The flexible circuit board strip 500 is preferably made by cutting from a flexible printed circuit board (FPC) and includes a light source section 510, a connection section 530, and a signal transmission section 550. The light source section 510 preferably extends along the light entrance edge 311 of the light guide plate 310 and the first side 210 of the electromagnetic touch panel 200. Moreover, the light source section 510 has a light source disposing plane 511. As shown in FIG. 10, the light source disposing plane 511 is preferably perpendicular to the light guide plate 310 and the electromagnetic touch panel 200. That is, the light source disposing plane 511 is parallel to the plane of the light entrance edge 311 of the light guide plate 310 and the plane of the first side 210 of the electromagnetic touch panel 200. The light source 600 is disposed on the light source disposing plane 511 and preferably emits light in a direction perpendicular to the light source disposing plane 511 towards the light entrance edge 311 of the light guide plate 310. In one embodiment, the light source disposing plane 511 is referred to the surface of the wider extent of the strip type light source section 510.

Figure 11:
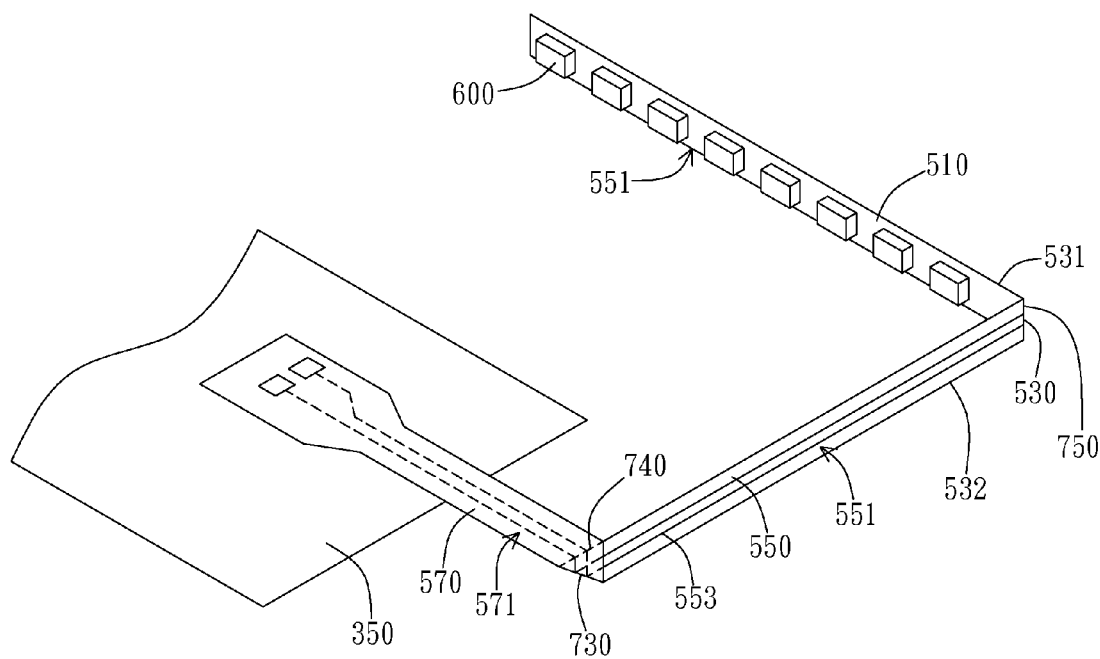
FIG. 11 is a schematic view of another embodiment of a signal connection section.

As shown in FIG. 10 and FIG. 11, the signal transmission section 550 extends along the side edge 313 of the light guide plate 310 and the second side 220 of the electromagnetic touch panel 200, and the extending direction thereof is preferably perpendicular to the extending direction of the light source section 510. The signal transmission section 550 has a wiring disposing plane 551 with signal wiring 553 disposed thereon. The signal wiring 553 is connected to the light source 600 to provide power to the light source 600 for emitting light. In one embodiment, the wiring disposing plane 551 is referred to the surface of the wider extent of the strip type signal transmission section 550. Moreover, the wiring disposing plane 551 can be on either side of the signal transmission section 550. In other words, the wiring disposing plane 551 and the light source disposing plane 511 can be located on the same side or opposite sides of the flexible circuit board strip 500. The wiring disposing plane 551 includes an angle with respect to the light source disposing plane 511. In one embodiment, this angle is a right angle, i.e. 90 degrees. However, in other embodiments, this angle can be modified according to different design need. Moreover, the wiring disposing plane 551 is preferably parallel to the plane of the side edge 313 of the light guide plate 310. If the electromagnetic touch panel 200 is considered as a horizontal plane, the wiring disposing plane 551 is disposed on a vertical plane with respect to the electromagnetic touch panel 200.

As shown in FIG. 10 and FIG. 11, in the arrangement described above, the area of the signal transmission section 550 projected on the electromagnetic touch panel 200 can be minimized to about only the thickness of the signal transmission section 550, which is measured along the normal to the wiring disposing plane 551. Therefore, the influence of the signal wiring 553 or the transmitted power and signals to the electromagnetic touch panel 200 during sensing can be minimized. Moreover, since the signal transmission section 550 is disposed vertically, the increase in width and area of the overall module is significantly limited when the signal transmission section 550 is disposed on the side edge 313 of the light guide plate 310 or the second side 220 of the electromagnetic touch panel 200.

As shown in FIG. 10 and FIG. 11, the connection section 530 has a first end 531 and a second end 532. The first end 531 is connected to one end of the light source section 510, and the second end 532 is connected to one end of the signal transmission section 550. That is, the connection section 530 is connected between the light source section 510 and the signal transmission section 550. The connection section 530 has a fold 750. In this embodiment, the fold 750 is between the first end 531 and the second end 532 of the connection section 530. However, in other embodiments, the fold 750 can be located at the connection with the light source section 510 or the signal transmission section 550. As shown in FIG. 11, when the folding process is completed, part of the flexible circuit board strip 500 following the fold 750, such as part of the connection section 530, and the light source disposing plane 511 are non-coplanar and include an angle. In one embodiment, the angle is about 90 degrees. However, in other embodiment, the angle can be modified based on the relative positions of elements. When the folding process is completed, the fold 750 makes the wiring disposing plane 551 and the light source disposing plane 511 include an angle of about 90 degrees and also makes the extending direction of the signal transmission section 550 be parallel to the normal to the light source disposing plane 511 or perpendicular to the light source disposing plane 511. In other words, in this embodiment, when the fold 750 is formed, the light source disposing plane 511 and the wiring disposing plane 551 are non-coplanar with respect to each other and preferably perpendicular to each other, and part of the connection section 530 before the fold 750 and part of the connection section 530 after the fold 750 are coplanar to the light source disposing plane 511 and the wiring disposing plane 551, respectively.

As shown in FIG. 11, the flexible circuit board strip 500 further includes a signal connection section 570 connected to the other end of the signal transmission section 550 opposite to the connection section 530. The extending direction of the signal connection section 570 includes an angle with respect to the extending direction of the signal transmission section 550, and this angle is preferably about 90 degrees. Moreover, the signal connection section 570 further includes a signal connection plane 571 parallel to the light guide plate 310 and the electromagnetic touch panel 200. In one embodiment, the signal connection plane 571 is referred to the surface of wider extent of the strip type signal connection section 570. A control circuit board 350 is preferably provided on the back side of the backlight module 300 and parallel to the light guide plate 310, as shown in FIG. 10 and FIG. 11. The signal connection plane 571 is horizontally connected to the control circuit board 350 to receive power and signals from the control circuit board 350 and transmit them to the light source 600 through signal transmission section 550, so that the light source 600 can emit light. In this embodiment, the signal transmission section 550 and the signal connection section 570 can be considered as two different sections of the same flexible circuit board strip. However, in other embodiments, the signal connection section 570 can be constituted by arranging other electronic elements.

In the embodiment of FIG. 11, the connection region of the signal connection section 570 and the signal transmission section 550 includes a third fold 730 and a fourth fold 740. The third fold 730 is close to the signal transmission section 550, and the fourth fold 740 is close to the signal connection section 570. As shown in FIG. 11, the signal connection section 570 is folded inwardly towards the light guide plate 310 to form the third fold 730, and the fold line of the third fold 730 preferably includes an angle of about 45 degrees with respect to the extending direction of the signal transmission section 550. However, in other embodiments, the signal connection section 570 can be folded outwardly opposite to the light guide plate 310 to form the third fold 730. After forming the third fold 730, the folded part is then folded at an angle preferably of 90 degrees towards the light guide plate 310 or the control circuit board 350 to form the fourth fold 740. The fold line of the fourth fold 740 is preferably perpendicular to the extending direction of the signal connection section 570. As shown in FIG. 11, a portion of the flexible circuit board strip between the third fold 730 and the fourth fold 740 overlaps the wiring disposing plane 551 and is substantially perpendicular to the signal connection plane 571.

In the embodiment of FIG. 10 and FIG. 11, before the fold 750 is formed, the light source section 510, the connection section 520, and the signal transmission section 550 are disposed collinearly, i.e. arranged in a straight line. Furthermore, the light source disposing plane 511 and the wiring disposing plane 551 are coplanar. In one embodiment, the flexible circuit board strip 500 can be formed by directly cutting from a whole piece of flexible printed circuit board based on the desired shape to form the light source section 510, the connection section 530, and the signal transmission section 550 in one piece.

As shown in FIG. 11, the connection section 530 is first bent at an angle preferably of 90 degrees to form the fold 750. The fold line of the first fold 710 is preferably perpendicular to the extending direction of the light source section 510. Therefore, the folded part of the flexible circuit board strip 500 including part of the connection section 530 and the signal transmission section 550 are substantially parallel to the plane of the side edge 313 of the light guide plate 310.

Similarly, one or more auxiliary folds (not shown) can be formed on the signal transmission section 550 of FIG. 10 to enhance the structural strength and accommodate different design needs as describe above. Moreover, as shown in FIG. 10, the backlight module 300 further includes a frame 800 surrounding the light guide plate 310 and the electromagnetic touch panel 200. In this embodiment, the frame 800 is similar to that described in FIG. 8, which can include a groove formed in the sidewall and configured to accommodate the signal transmission section 550.

The present invention has been described through the relevant embodiments above; however, the embodiments above are only exemplary. What needs to point out is that the embodiments disclosed are not intended to limit the scope of the present invention. Contrarily, the modifications and the equivalents included in the spirit and scope of the claims are all included in the scope of this invention.

What is claimed is:

1. A backlight module, comprising:
a light guide plate having a light entrance edge and a side edge adjacent to each other; and
a light source module comprising:
a flexible circuit board strip having:
a light source section having a light source disposing plane and extending along the light entrance edge;
a connection section connected to one end of the light source section; and
a signal transmission section extending along the side edge of the light guide plate, wherein the signal transmission section has a wiring disposing plane parallel to a plane of the side edge of the light guide plate, the wiring disposing plane is the surface of the wider extent of the signal transmission section, one end of the signal transmission section is connected to the connection section;
wherein the connection section includes a first fold and a second fold making a portion of the wiring disposing plane parallel to the plane of the side edge of the light guide plate and the light source disposing plane are non-coplanar and include at least one angle, before the first fold and the second fold are formed, the light source section and the signal transmission section are disposed side by side, the light source disposing plane and the wiring disposing plane are coplanar, and the connection section is transversely connected between the light source section and the signal transmission section; and
a plurality of light sources, disposed along an extending direction of the light source section on the light source disposing plane, for emitting light towards the light entrance edge.

2. A backlight module, comprising:
a light guide plate having a light entrance edge and a side edge adjacent to each other; and
a light source module comprising:
a flexible circuit board strip having:

a light source section having a light source disposing plane and extending along the light entrance edge;

a connection section having a first end and a second end, wherein the first end is connected to one end of the light source section; and a signal transmission section extending along the side edge of the light guide plate, wherein the signal transmission section has a wiring disposing plane parallel to a plane of the side edge of the light guide plate, the wiring disposing plane is the surface of the wider extent of the signal transmission section, one end of the signal transmission section is connected to the second end of the connection section;

wherein the connection section has a first fold and a second fold, part of the connection section between the first fold and the second fold and the light source disposing plane are non-coplanar and include a first angle, the second fold makes the wiring disposing plane and the light source disposing plane include a second angle, and an extending direction of the signal transmission section is parallel to the light source disposing plane, before the first fold and the second fold are formed, the light source section and the signal transmission section are disposed side by side, the light source disposing plane and the wiring disposing plane are coplanar, and the connection section is transversely connected between the light source section and the signal transmission section; and a plurality of light sources, disposed along an extending direction of the light source section on the light source disposing plane, for emitting light towards the light entrance edge.

3. A display device, comprising:

a display panel;

an electromagnetic touch panel overlapping the display panel and having a first side and a second side adjacent to each other; and a backlight module, disposed between the display panel and the electromagnetic touch panel, for providing light to the display panel, the backlight module including:

a light source module comprising:

a flexible circuit board strip having:

a light source section having a light source disposing plane and extending along the first side of the electromagnetic touch panel;

a connection section connected to one end of the light source section; and a signal transmission section extending along the second side of the electromagnetic touch panel, wherein the signal transmission section has a wiring disposing plane parallel to a plane of the second side, the wiring disposing plane is the surface of the wider extent of the signal transmission section, one end of the signal transmission section is connected to the connection section;

wherein the connection section has a first fold and a second fold making a portion of the wiring disposing plane parallel to the plane of the second side and the light source disposing plane are non-coplanar and include at least one angle, before the first fold and the second fold are formed, the light source section and the signal transmission section are disposed side by side, the light source disposing plane and the wiring disposing plane are coplanar, and the connection section is transversely connected between the light source section and the signal transmission section; and a plurality of light sources disposed along an extending direction of the light source section on the light source disposing plane.

4. The display device of claim 3, wherein the at least one angle includes a first angle and a second angle, so that part of the connection section between the first fold and the second fold and the light source disposing plane are non-coplanar and include the first angle, the second fold makes the wiring disposing plane and the light source disposing plane include the second angle, and an extending direction of the signal transmission section is parallel to the light source disposing plane.

5. The display device of claim 4, wherein the light source disposing plane is perpendicular to a plane of the first side of the electromagnetic touch panel.

6. The display device of claim 4, wherein the part of the connection section between the first fold and the second fold is perpendicular to the light source disposing plane.

7. The display device of claim 4, wherein the part of the connection section between the first fold and the second fold is perpendicular to the wiring disposing plane.

8. The display device of claim 4, wherein a fold line of the first fold is perpendicular to a fold line of the second fold.

9. The display device of claim 4, wherein a fold line of the first fold is parallel to the extending direction of the light source section, a fold line of the second fold is parallel to a normal to the light source disposing plane.

10. The display device of claim 3, further comprising a signal connection section connected to the other end of the signal transmission section, wherein the signal connection section includes a signal connection plane parallel to the electromagnetic touch panel.

11. The display device of claim 10, wherein a connection region of the signal connection section and the signal transmission section includes a third fold and a fourth fold, part of the flexible circuit board strip between the third fold and the fourth fold parallelly overlaps the wiring disposing plane and is substantially perpendicular to the signal connection plane.

12. The display device of claim 3, further comprising a frame surrounding the electromagnetic touch panel, wherein the frame has a side wall corresponding to the second side of the electromagnetic touch panel, the side wall has a groove parallel to the second side, and the signal transmission section is accommodated in the groove.

13. The display device of claim 3, wherein the area of the signal transmission section projected on the electromagnetic touch panel is about the thickness of the signal transmission section, which is measured along the normal to the wiring disposing plane.

* * * * *